Feb. 16, 1960 W. H. PAYNE 2,925,092
PRESSURE-HOLDING VALVE WITH PRESSURE-SHIFTED JET
Filed Aug. 11, 1954
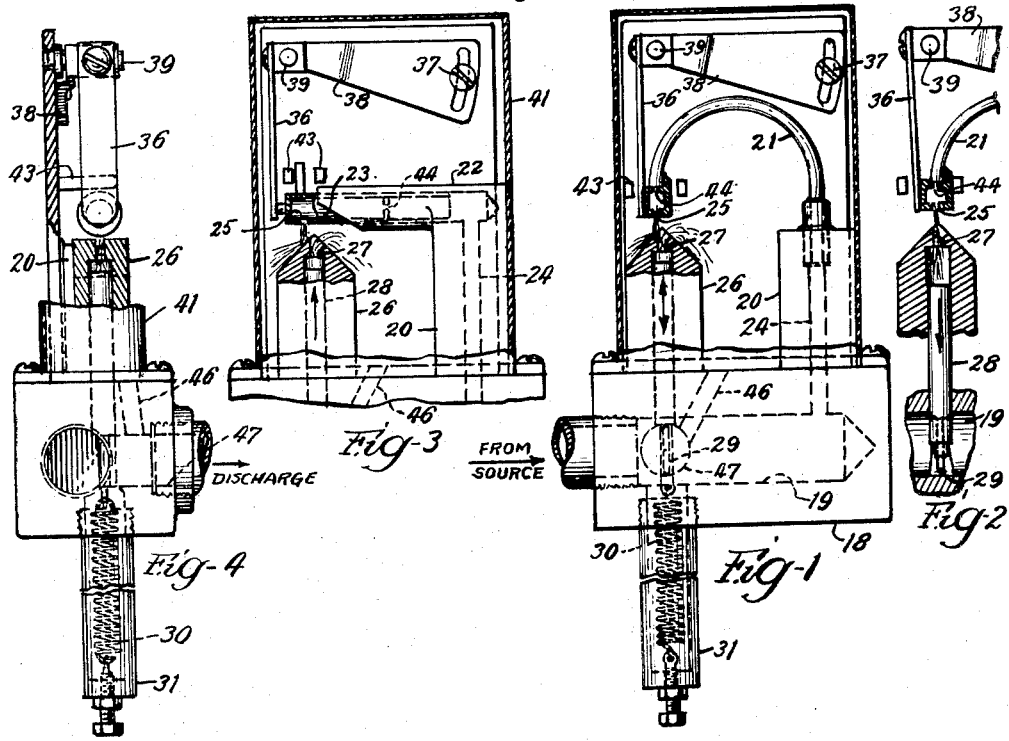
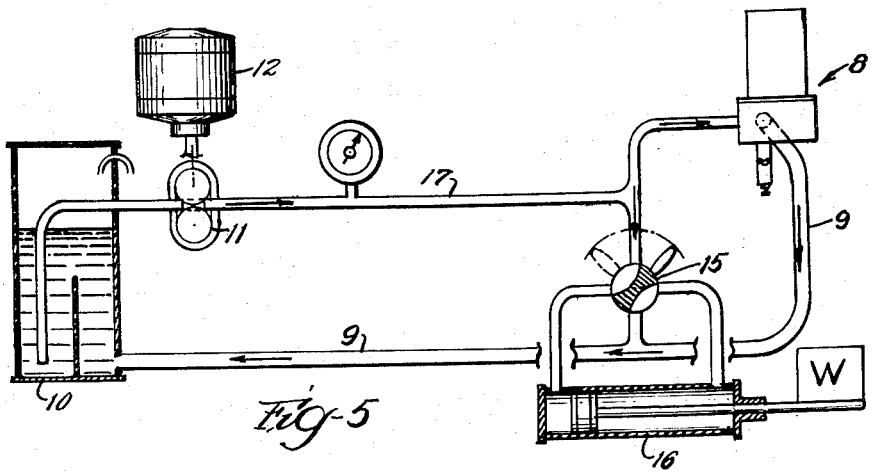
INVENTOR.
William Harvey Payne
BY
Louis Robertson Atty.

United States Patent Office 2,925,092
Patented Feb. 16, 1960

2,925,092

PRESSURE-HOLDING VALVE WITH PRESSURE-SHIFTED JET

William Harvey Payne, Pine Hall, N.C.

Application August 11, 1954, Serial No. 449,230

4 Claims. (Cl. 137—488)

This invention relates in general to apparatus for maintaining a constant fluid pressure for the operation of fluid actuated machines.

This pressure holding valve is distinguished from prior pressure relief valves and pressure control valves, in that it may constantly adjust its rate of "bleed" of fluid from the usage line, in a wide range from zero flow to full pump output flow, by its pressure-sensed jet servo-mechanism.

Existing spring-loaded pressure relief valves usually open their "bleed" ports in relation to excess pressure, that is, the higher the pressure, the greater the opening. Such valves can be set to hold a desired pressure for only one rate of fluid usage.

Other pressure-control valves are a pilot type. They usually have a slow response to surge changes in the fluid usage line. They are generally not good at reasonably low pressures, and permit rather wide pressure changes, at starting and initial (low) g.p.m. usage.

It is well understood by those skilled in the art that the rate of flow of fluid under pressure, through a control valve, with a given port area, is proportional to the pressure drop across the control valve port. It follows that regulation would be easy if we had a constant source of fluid pressure on one side of a control valve, and a fixed load to be moved by valve control: a given control valve port area would always move that fixed load at the same speed.

It is more difficult to secure uniform speed by valve control in moving a variable load under the other above conditions. We must compensate for the varying load or other changes by control of valve port area.

One important object of the present invention is to furnish a valve which will hold extremely close to a constant pressure in a fluid pressure line over a full fluid usage range.

Another object of this invention is to provide a pressure-holding valve to do as above, which is simple to manufacture and has few moving parts. Preferably the moving parts are all of low inertia and quickly responsive in other respects, so that the parts can cooperate for instant response, in repositioning a "bleed" valve, to hold a substantially constant pressure in the pressure supply line, from zero usage to full usage.

Another object of this invention is to provide a pressure-holding valve which, when connected to a fluid pressure source having a constant volume of delivery, will "bleed" the pressure source in an inverse g.p.m. value, to the g.p.m. passed through the associated fluid usage machines, so that the sum of the pressure-holding valve "bleed" g.p.m. plus the usage machine's g.p.m. is always equal to the g.p.m. of the pressure source fluid pump.

Another object of this invention is to provide a pressure-holding valve which is sensed by the desired system pressure, through a pressure moved jet servo-mechanism, which will quickly adjust the valve "bleed" piston over any part of its full range, and hold it at a correct position.

Still another object of the invention is to use a pressure sensed jet velocity pressure means for moving of the "bleed" piston, wherein usage system pressure biases the jet nozzle against a suitable opposing spring in one direction, at right angles to the jet stream; the jet nozzle movement being such that, in one extreme position, the jet stream impinges fully against a "bleed control" piston, with sufficient jet velocity pressure to push it away; and when in the other extreme position, the jet stream entirely misses the "bleed control" piston, thus allowing it to move in a reverse direction; and when in a balancing mid-point of movement, the jet stream divides its velocity pressure against the "bleed" piston, so that the "bleed" piston's opposing pressure makes it stand still, and varying degrees of departure in the amount of jet stream impingement from the balance point thus provide changeable rates of "bleed control" piston movement speed, but all promptly provide substantially full correction of the "bleed" rate.

The foregoing and other important objects, advantages and inherent functions of the invention will become apparent as the same is more fully understood from the following description which, taken in connection with the accompanying drawings, disclose a preferred embodiment of the present invention.

Designation of figures

Fig. 1 is a side view of the valve, embodying the features of this invention, with the front part of the cover cut away to better show the Bourdon tube jet nozzle moving means.

Fig. 2 shows a fragment of Fig. 1, with the jet directed fully to the "bleed control" piston.

Fig. 3 is similar to Fig. 1, but of a modified form using a pressure sensed piston.

Fig. 4 is an end view of the valve of Fig. 3, again with the top of its cover cut away.

Fig. 5 is a schematic diagram to illustrate a typical system using this invention.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

Typical system

The operation of the pressure-holding valve 8 in a typical system, such as is diagrammed in Fig. 5, calls for a fluid-holding tank 10, piped to a pressure generating pump 11, driven by motor 12, to constitute one form of a fluid pressure source.

Fluid control valve 15, and cylinder 16, and load W, piped as shown, illustrate one arrangement of a fluid usage machine.

In this arrangement, it is desirable to hold a constant fluid pressure in pipe 17, which jointly feeds fluid under pressure to the pressure-holding valve 8, and to the usage machine 16.

Specific description of valve

In further detailed explanation, valve body 18 is shown with a main bore or passage 19 partly through it and designed to fit the piping arrangement illustrated. However it is clear that this could be a passage through the body and that the holding valve 8 will function equally as well when it is in line 17 as when it is in a branch from line 17.

Valve body 18 also has projection 20, which in the case of Fig. 1 holds the fixed end of Bourdon tube 21. In the case of Fig. 3 construction, it holds the fixed cylinder 22, which slidably confines jet-directing piston 23.

Passage 24 in projection 20 carries a small proportion of the fluid and fluid-source pressure toward the jet orifice 25.

Valve body 18 has a second projection 26, which has at its top end a hole 27, matching the jet hole 25 in size, leading downwardly into a slightly enlarged cylinder hole, snugly containing "bleed control" piston 28. Looking at Fig. 1 and Fig. 4, the "bleed control" piston hole intercepts one side of the larger passage 19. Elongated "bleed" outport 29, having its length parallel to the "bleed control" piston, connects passage 19 to the return pipe 9. "Bleed control" piston 28 may be made of light material and of a length so that when the piston is at its "up" position, its lower end will uncover all of the port 29, as seen in Fig. 1, and, when it is at its lowest position, it will cover, or close, all of the port 29 and allow all degrees of port 29 "bleed" in between its full open and closed positions, as above described. Thus the lower part of piston 28 is a valve.

Piston 28, as shown in Figs. 1 and 4, may have at its lower end a small diameter extension and a suitable tension spring 30 hooked thereto. The other end of spring 30 is hooked to an adjusting screw, fixed in a third projection 31, from body 18. The purpose of tension spring 30 is to oppose the system fluid pressure in passage 19, which biases the piston 28 upwardly. Spring 30 tension may be set so that its pull is always a little less than the fluid pressure up-push on piston 28 with the desired pressure. Thus the piston 28 will be biased to move upward toward the jet, when the jet is discharging to one side, as is illustrated in Fig. 3.

The differential to move piston 28, being low, requires but a small jet velocity pressure from a part or full jet stream impingement, to move it at any speed between standing still and an instantaneous readjustment of its "bleed," over its entire movable range.

The jet nozzle is at a suitable distance from the matched opening, which leads into the top end of the cylinder hole, snugly containing the "bleed control" piston 28, so that any deflected spill from the jet stream will not affect the accuracy of the pressure-sensed movement of the jet.

Thus, in operation, a slight change in pressure above or below the desired pressure at which the fluid source 11 is set to deliver, and within its control range, will cause the jet nozzle to move to a new position with a different proportion of flow into hole 27, which in turn will move "bleed control" piston over any part of its full range to discharge more or less fluid away from pressure line 17, until pressure in pipe 17 is at the desired value.

It will be observed that with either the Bourdon tube 21 or the piston 23 the pressure of the fluid delivered through passage 24 will tend to move the jet orifice 25 to the left. A spring 36, shown in the form of a leaf spring, urges the part carrying jet orifice 25 to the right. The tension on spring 36 may be adjusted as by loosening screw 37 and shifting blade 38 which is pivoted on a pin 39. A screw device may be provided for thrusting blade 38 upwardly if desired, and this may be accessible from the outside of the cover or dome 41.

The tension on spring 36 is such that, with the desired pressure in the pressure supply pipe 17, the jet from orifice 25 will be divided somewhat as illustrated in Fig. 1, with a portion of this jet flowing through the opening 27 to exert its force on the "bleed control" piston 28. With some division of the jet stream, the force thus applied to piston 28 will be just enough to hold it in equilibrium. Preferably, the division required for this purpose is somewhere near half of the stream. If, now, a decrease in the flow to the work should produce a momentary increase in the pressure of the fluid in pipe 17, this increase would be immediately transmitted to the pressure-responsive device, namely, the cylinder 22 or the Bourdon tube 21. With either one, the pressure will overcome the tension of spring 36 and shift the jet to the left so that the entire stream from the jet will be deflected away from the opening 27, as seen in Fig. 3. The pressure of the fluid on the underside of "bleed control" piston 28 will now be able to raise this piston to uncover more of the "bleed" opening 29. As soon as the pressure in bore 19 and pipe 17 has thus been lowered back to the normal pressure, spring 36 will shift orifice 25 back to a "balance" position, and the "bleed control" piston 28 will be moved back toward a "bleed" reducing position or held, as conditions may require. If there should be a momentary deficiency of pressure in pipe 17, the orifice 25 would be shifted to the right, toward its position seen in Fig. 2, in which it is fully aligned with the opening 27. Here the full force of the jet is applied to the "bleed controlling" piston 28 and is enough to lower this piston against the fluid pressure exerted on the bottom of the piston. Thus the piston closes all or a larger part of the "bleed" opening 29, until the pressure in bore 19 increases again to shift the orifice 25 back toward or past the "balance" position.

The spring 30 is preferably of considerable length as compared to the length of the "bleed" orifice 29 so that its changes of tension will be quite small during the useful movement of the "bleed control" piston 28. Nevertheless, there will be enough change of tension to have a slight stabilizing effect on the position of the "bleed control" piston 28, or on its tendency to assume a given position. If conditions should require the utmost uniformity of pressure, it may be found desirable to use a weight in place of spring 30. Under some conditions, it would not be necessary to have an added weight, the weight of piston 28 being itself sufficient.

Stops 43 are preferably provided to limit the jet movement, as illustrated. It is particularly important that the right-hand stop shown in use in Fig. 2 be provided, so that the jet 25 will not move out of alignment with opening 27 as the pressure falls below that which produces the alignment.

For use in systems having very high fluid pressures, some reduction of the pressure before it reaches the jet orifice 25 is desirable. At the same time, it is important that the pressure sensing system (the pressure responsive unit) be subjected to the entire fluid pressure. These requirements may be reconciled by providing a small orifice 44, a little ahead of the orifice 25. How much larger the orifice 25 should be than the orifice 44 will depend in part upon the pressure for which the system is designed. Foaming of the liquid can be objectionable and can be minmized by avoiding excessive pressures at the jet 25. With a hydraulic system operating at a pressure around 1,000 lb. per sq. in., it is contemplated that the two orifices will be of such size that the pressure at the jet 25 will be in the neighborhood of 150 lbs. per sq. in. average.

In illustrating some of the various mechanical arrangements of the invention on the drawings, we have shown two methods of pressure moving a jet nozzle at right angles to the jet stream. It should be clear, however, that a pressure sensed bellows could be used as well as the Bourdon tube and small piston, as are illustrated.

It is thought that the invention with its numerous advantages will be fully understood from the foregoing description, and it is obvious that many changes can be made in the various mechanical arrangements without departing from the intent and spirit and scope of the invention, or sacrificing any of its attendant advantages. The form of the invention herein disclosed is the preferred arrangement for the purpose of illustrating the invention.

It should be understood that in all forms of the invention, adequate drainage should be provided for the spent fluid from the jet. With the illustrated forms of the invention, a passage 46 communicates from within the bottom portion of the area enclosed within zone 41 to the discharge or "bleed" chamber 47. The return pipe 9 should be of adequate cross section so that back pressure would not prevent adequate drainage through passage 46. Of course, a separate line from the bottom of the space within the dome 41 to the reservoir 10 may be provided, if desired or if needed.

Inasmuch as the velocity of the jet is utilized, the close spacing between jet orifice 25 and aperture 27 is not essential. Avoiding a sealed engagement has some inherent advantages, including freedom from friction and the resultant more dependable movement of the jet. An inherent advantage of the illustrated fairly close spacing of the orifice 25 above the opening 27 is the ease of keeping the jet concentrated so that its full force can be used and so that a fairly small jet movement will be sufficient to remove it entirely from opening 27.

The invention is inherently capable of being applied to other types of pressure-regulating valves. For example, the valve could function as a pressure-reducing valve to maintain an exceptionally constant pressure on its discharge side. Any changes necessary for such use are believed to be within the skill of the art.

The invention is hereby claimed as follows:

1. An automatic pressure control valve including a body forming a main chamber adapted to communicate with a first pipe, a port communicating with the chamber on one side, and adapted on the other side to be connected to another pipe, said body forming a cylinder opening axially into said chamber approximately in alignment with said port, a piston slidable in said cylinder and forming a valve for said port, a Bourdon tube communicating at one end with said chamber and having said end fixed in position and having a jet orifice at its other end, said other end being movable between first and second positions in response to changes of pressure within said Bourdon tube, said body having an opening communicating with said cylinder beyond the piston from said port, said opening being aligned with the jet when said orifice is in a first position and substantially out of alignment with said jet when said orifice is in the second position, said piston being shiftable under the influence of the jet in the first position to close the port progressively and to maintain the piston in the position to which it is moved until the pressure in the tube and the chamber is sufficient to shift the orifice from the first position.

2. An automatic pressure control valve including a body forming a main chamber adapted to communicate with a first pipe, a port communicating with the chamber on one side, and adapted on the other side to be connected to another pipe, said body forming a cylinder opening axially into said chamber approximately in alignment with said port, a piston slidable in said cylinder and forming a valve for said port, a pressure-responsive device communicating at one end with said chamber and having said end fixed in position and having a jet orifice at its other end, said other end being movable between first and second positions in response to changes of pressure within said device, said body having an opening communicating with said cylinder beyond the piston from said port, said opening being aligned with the jet when said orifice is in a first position and substantially out of alignment with said jet when said orifice is in the second position, said piston being shiftable under the influence of the jet in the first position to close the port progressively and to maintain the piston in the position to which it is moved until the pressure in the device and the chamber is sufficient to shift the orifice from the first position.

3. An automatic pressure control valve, including a main valve body having a pressure chamber therein and a discharge chamber to one side, with a valve bleed port connecting the two chambers, and a piston chamber disposed between the first two chambers, a piston slidable in the chamber across said port to vary the port opening, and exposed at its inner end to system pressure biasing the piston outwardly, and means having a jet orifice and responsive to system pressure to move the orifice in a direction at right angles to the direction of discharge from the orifice, said piston chamber having a hole leading into the outer end of the piston chamber and disposed to receive the jet from said jet orifice in one position of the orifice, a spring opposing the pressure-induced movement of the jet orifice, all so related that excessive system pressure will move the jet away from the jet receiving hole, and allow the system pressure to move the piston out, to open the bleed port to restore the desired system pressure, and in the case of deficient system pressure the jet orifice will be disposed so that its jet will move toward the jet receiving hole, said valve including means for causing the velocity pressure of the jet when aligned with the jet receiving hole to move the piston in a port-closing direction to decrease the system bleed and restore the desired system pressure.

4. An automatic pressure control valve, including a main valve body having a pressure chamber therein and a discharge chamber to one side, with a valve port connecting the two chambers, and a piston chamber disposed between the first two chambers, a piston slidable in the piston chamber across said port to vary the port opening between the chambers and exposed at its inner end to system pressure biasing the piston outwardly, and means having a jet orifice and responsive to system pressure to move the orifice in a direction at right angles to the direction of discharge from the orifice, a jet receiving hole directly in the outer end of the piston chamber and aligned with the jet from the jet orifice in one position of the orifice, all so related that departure of controlled system pressure from normal will move the jet away from the jet receiving hole, and allow the controlled system pressure to move the piston out, to open the port to restore the desired system pressure, and in the case of an opposite departure of controlled system pressure the jet orifice will be disposed so that its jet will move toward the jet receiving hole, said valve including means for causing the velocity pressure of the jet when aligned with the jet receiving hole to move the piston in a port-closing direction to restore the desired controlled system pressure.

References Cited in the file of this patent

UNITED STATES PATENTS

| | | |
|---|---|---|
| 1,620,707 | Wunsch | Mar. 15, 1927 |
| 1,944,339 | Wunsch | Jan. 23, 1934 |
| 2,185,671 | Kimball | Jan. 2, 1940 |
| 2,193,240 | Schmidt | Mar. 12, 1940 |
| 2,333,044 | Rosch | Oct. 26, 1943 |